B. DANLEY.
POULTRY RACK.
APPLICATION FILED OCT. 4, 1916.
1,238,273.
Patented Aug. 28, 1917.
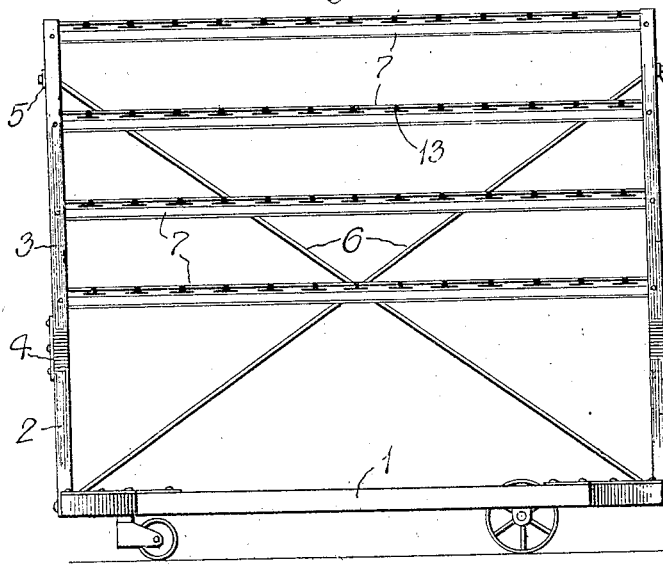
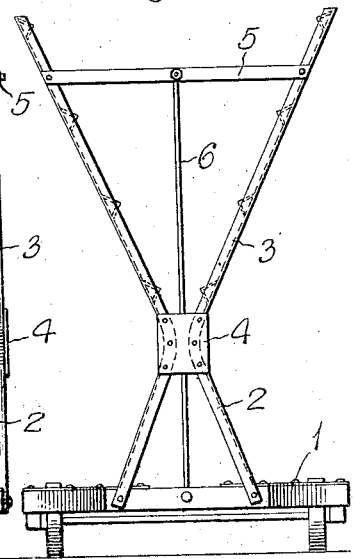
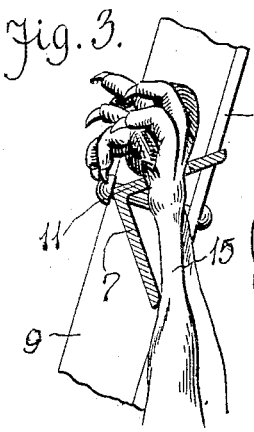
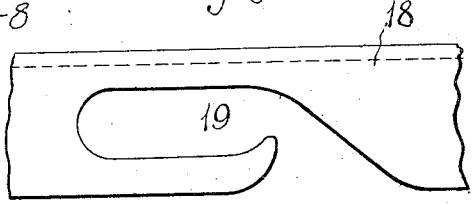
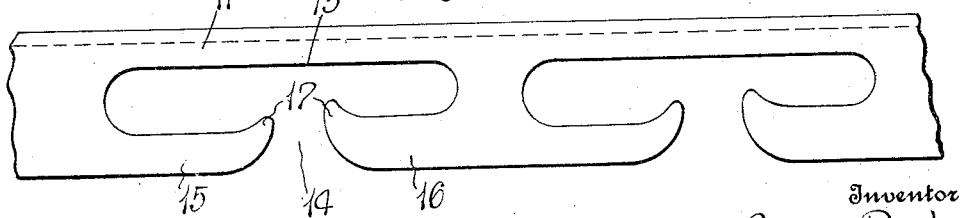
Inventor
Byron Danley,
Witnesses
Karl H. Butler
Chas. W. Stauffiger
By
Attorneys

UNITED STATES PATENT OFFICE.

BYRON DANLEY, OF ST. JOHNS, MICHIGAN.

POULTRY-RACK.

1,238,273.  Specification of Letters Patent. Patented Aug. 28, 1917.

Application filed October 4, 1916. Serial No. 123,628.

*To all whom it may concern:*

Be it known that I, BYRON DANLEY, a citizen of the United States of America, residing at St. Johns, in the county of Clinton and State of Michigan, have invented certain new and useful Improvements in Poultry-Racks, of which the following is a specification, reference being had therein to the accompanying drawings.

This invention relates to a poultry rack, and the primary object of my invention is to provide novel rack bars which may be used in connection with portable racks, a market stall, refrigerator and storage houses or any place where it is desired to safely suspend poultry, various kinds of meat, and merchandise, without resorting to any fastening means that requires manipulation to retain merchandise in engagement with the rack bars.

A further object of my invention is to provide a simple, inexpensive and durable poultry rack bar that can be maintained in a sanitary condition and positioned to positively retain poultry in engagement therewith, the rack bar having provision whereby various kinds of poultry or game can be suspended from a bar.

The above and other objects are attained by a mechanical construction to be hereinafter described and then claimed, and reference will now be had to the drawing, wherein—

Figure 1 is a side elevation of a portable poultry rack provided with rack bars in accordance with my invention;

Fig. 2 is an end view of the same;

Fig. 3 is an enlarged cross sectional view of a rack bar, illustrating the manner of suspending poultry from the same;

Fig. 4 is a similar view of the rack bar showing the fastening means thereof;

Fig. 5 is a plan of a portion of the rack bar; and

Fig. 6 is a similar view, illustrating a slight modification of my invention.

In the drawing, 1 denotes a truck provided with end frames, each made of two angle bars bent to provide converging lower portions 2 and diverging upper portions 3. The angle bars are connected together by plates 4 and braces 5 with the braces 5 connected to the truck 1 by diagonally disposed tie rods 6, thus providing rigid, skeleton, vertically disposed end frames on the truck 1.

The upper diverging portions 3 of the angle bars of each end frame afford supports for longitudinally disposed parallel rack bars 7 connecting the angle bars of one end frame to the angle bars of the other end frame, as best shown in Fig. 1. The rack bars 7 are preferably made of angle bars and are positioned with the edges of the flanges of said bars engaging and resting on inwardly projecting flanges 8 of the angle bars forming the end frames. The other flanges 9 of these same end angle bars close the ends of the rack bars 7 and said rack bars are connected to the flanges 8 by bolts, rivets or other fastening means 10 extending through the flanges 8 and the angle portions or ridges of the rack bars 7, as best shown in Fig. 4.

To determine the angularity of the rack bars 7 relative to the angle bars of the end frames, the upper flanges 11 of the rack bars may be cut away, as at 12 to provide clearance for the flanges 8 of the end-frame angle bars, thereby allowing the top flanges 11 of the rack bars to protrude outwardly from between the end frame angle bars and this is also best shown in Fig. 4.

The top flange 11 of each rack bar is provided with a series of spaced longitudinally disposed slots 13, and communicating with said slots are entrance passages 14 formed in the front edge of the flange 11, intermediate the ends of each slot 13. The entrance passages 14 open the slots 13 for ready entrance of the legs 15 of a chicken or other poultry into the slot 13 and it is an extremely easy matter to shift the legs 15 into either end of the slot.

By providing the top flange 11 of each rack bar with slots and passages there is necessarily formed arms 15 and 16 at the sides of each passage, and the arm 15 is made of a less width than the arm 16 in order that one end of the slot 13 will be of a greater width than the other end. This is essential in order that fowls of various sizes or weight may be suspended from the rack bar. For instance, the legs of a large fowl can be placed in the large end of the slot 13 and the legs of the small fowls, as "broilers", may be placed in the small end of the slot. When an exceedingly large fowl is encountered for instance, a turkey, one leg may be placed in one end of the slot and the other leg in the opposite end. To prevent such placed legs from becoming accidentally displaced or shifted longitudinally of the slot, the ends of the arms 15 and 16 are turned inwardly or formed with lips or lugs 17 which confine legs within the ends of the slots. The inwardly projecting lips or lugs 17 also assist in forming the entrance passage 14.

By reference to Fig. 5, it will be observed that the material between the slots 13 supports the arms 15 and 16 and in some instances it is possible to place one leg of a fowl in one of the ends of the slot 13 and the other leg of the fowl in the end of another slot 13. Such disposal of the legs may be necessary when other game, than fowl is suspended from a rack bar.

By reference to Fig. 3, it will be observed that the legs 15 bind against the lower edge of the rack bar 7 causing the legs to frictionally engage the front wall of the slot 13; the weight of the fowl being sufficient to cause the legs to frictionally impinge against the rack bar and prevent accidental displacement of the fowl.

In constructing a portable rack, such as shown in Figs. 1 and 2, it is preferable to dispose the diverging portions 3 of the end frames, at such an angle that the fowls suspended from one rack bar will not contact with the fowls of another rack bar, thus providing plenty of space for ventilation avoiding "sweating" and allowing any fowl to be removed without disturbing other fowls.

A rack bar 18, as shown in Fig. 6, may be provided with slots, such as indicated at 19, and this form of slot is practically one-half of one of the slots 13 and may also be formed in a rack bar with slots of other designs.

With the lower edge of the rack bar in a vertical plane that passes through the slots of the top flange 11 of the bar, it is apparent that fowl legs of any size will be frictionally held at opposite sides, by the flanges of an angle bar constituting a rack, and the lower flange of such an angle bar may be marked to indicate the weight of a fowl suspended in a slot of the bar.

While in the drawings there are illustrated the preferred embodiments of my invention, it is to be understood that the structural elements are susceptible to such variations and modifications as fall within the scope of the appended claims.

What I claim is:—

1. A poultry rack composed of angle bars having flanges thereof slotted and the remaining flanges positioned with the edges thereof in a vertical plane passing through the slots of the same bar, so that poultry suspended from the slotted flanges of the bars will engage the other flanges of said bars.

2. A poultry rack comprising end frames, angle bars having openings therein and said bars disposed at angles whereby poultry legs can be placed in the bar openings to frictionally engage a wall of each opening and another portion of each bar.

In testimony whereof I affix my signature in presence of two witnesses.

BYRON DANLEY.

Witnesses:
GLENN B. DANLEY,
DURELL N. HARRIS.

Copies of this patent may be obtained for five cents each, by addressing the "Commissioner of Patents. Washington, D. C."